US012309444B2

(12) United States Patent
Tabrizi

(10) Patent No.: US 12,309,444 B2
(45) Date of Patent: *May 20, 2025

(54) ARTIFICIAL INTELLIGENCE TECHNIQUES FOR PROJECTING VIEWERSHIP USING PARTIAL PRIOR DATA SOURCES

(71) Applicant: Recentive Analytics, Inc., Boston, MA (US)

(72) Inventor: Andysheh Tabrizi, Boston, MA (US)

(73) Assignee: RECENTIVE ANALYTICS, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,028

(22) Filed: Jul. 13, 2023

(65) Prior Publication Data
US 2024/0348851 A1 Oct. 17, 2024

Related U.S. Application Data

(63) Continuation of application No. 18/299,349, filed on Apr. 12, 2023, now Pat. No. 11,743,524.

(51) Int. Cl.
*H04N 21/262* (2011.01)
*H04N 21/234* (2011.01)
(Continued)

(52) U.S. Cl.
CPC . *H04N 21/26241* (2013.01); *H04N 21/23418* (2013.01); *H04N 21/251* (2013.01); *H04N 21/44204* (2013.01)

(58) Field of Classification Search
CPC ....... H04N 21/26241; H04N 21/23418; H04N 21/251; H04N 21/44204
See application file for complete search history.

(56) References Cited

U.S. PATENT DOCUMENTS 5,983,214 A 11/1999 Lang et al.
7,020,893 B2 3/2006 Connelly
(Continued)

FOREIGN PATENT DOCUMENTS

EP 2945113 A1 11/2015
JP 2003153305 A 5/2003
(Continued)

OTHER PUBLICATIONS

Anand et al., "Analysis and predicxtion of television show popularity rating using incremental K-means algorithm," International Journal of Mechanical Engineering and Technolog, vol. 9, 2018.
(Continued)

*Primary Examiner* — Oschta I Montoya
(74) *Attorney, Agent, or Firm* — Goodwin Procter LLP

(57) ABSTRACT

A computer-implemented method of dynamically determining when to broadcast video content. The method includes providing one or more content parameters corresponding to broadcasted video content to a machine learning (ML) model, iteratively training the ML model to identify relationships between the one or more content parameters and viewership ratings associated with the broadcasted video content, receiving one or more content parameters corresponding to unaired video content, wherein the one or more content parameters include a desired platform for broadcasting the unaired video content, receiving viewership data associated with the unaired video content and/or the desired platform, providing the one or more content parameters and the viewership data to the trained ML model, and determining, via the trained ML model, a target time period for broadcasting the unaired video content on the desired platform that maximizes a projected viewership rating of the unaired video content.

32 Claims, 5 Drawing Sheets

(51) Int. Cl.
*H04N 21/25* (2011.01)
*H04N 21/442* (2011.01)

(56) References Cited

U.S. PATENT DOCUMENTS

| | | | |
|---|---|---|---|
| 7,801,888 | B2 | 9/2010 | Rao et al. |
| 8,086,168 | B2 | 12/2011 | Moran et al. |
| 8,613,024 | B2 | 12/2013 | Bovenschulte et al. |
| 8,627,356 | B2 | 1/2014 | Storan et al. |
| 8,943,540 | B2 | 1/2015 | Traw et al. |
| 9,178,632 | B2 | 11/2015 | Grob et al. |
| 9,197,929 | B2 | 11/2015 | Volovich et al. |
| 9,363,557 | B2 | 6/2016 | Morales et al. |
| 9,641,882 | B2 | 5/2017 | Kitts et al. |
| 9,652,797 | B2 | 5/2017 | Vijayaraghavan et al. |
| 10,165,315 | B2 | 12/2018 | Epstein et al. |
| 10,671,854 | B1 | 6/2020 | Mahyar et al. |
| 10,789,377 | B2 | 9/2020 | Chen et al. |
| 10,867,308 | B2 | 12/2020 | Cui et al. |
| 11,399,214 | B1 | 7/2022 | Phillips et al. |
| 11,425,458 | B2 | 8/2022 | Sheppard et al. |
| 11,425,460 | B1 | 8/2022 | Dhiman et al. |
| 2003/0005465 | A1 | 1/2003 | Connelly |
| 2004/0049788 | A1 | 3/2004 | Mori et al. |
| 2004/0098743 | A1 | 5/2004 | Gutta et al. |
| 2006/0161952 | A1 | 7/2006 | Herz et al. |
| 2006/0287915 | A1 | 12/2006 | Boulet et al. |
| 2007/0190980 | A1 | 8/2007 | Britt et al. |
| 2007/0204298 | A1 | 8/2007 | Shanks et al. |
| 2008/0263578 | A1 | 10/2008 | Bayer et al. |
| 2008/0271070 | A1 | 10/2008 | Kanojia et al. |
| 2013/0311408 | A1 | 11/2013 | Bagga et al. |
| 2014/0059579 | A1 | 2/2014 | Vinson et al. |
| 2014/0092990 | A1* | 4/2014 | Vuskovic .......... H04N 21/85403 375/240.26 |
| 2014/0109124 | A1 | 4/2014 | Morales et al. |
| 2014/0196081 | A1* | 7/2014 | Emans ............... H04N 21/2542 725/32 |
| 2014/0207718 | A1 | 7/2014 | Bento Ayres Pereira et al. |
| 2014/0208340 | A1 | 7/2014 | Poornachandran et al. |
| 2016/0063380 | A1 | 3/2016 | Wang et al. |
| 2016/0112761 | A1 | 4/2016 | Venkataraman et al. |
| 2016/0294956 | A1 | 10/2016 | Fix et al. |
| 2017/0064395 | A1* | 3/2017 | Chaar .................. H04N 21/812 |
| 2017/0127110 | A1 | 5/2017 | Chaar et al. |
| 2017/0366854 | A1 | 12/2017 | Puntambekar et al. |
| 2018/0002025 | A1 | 1/2018 | Lents et al. |
| 2018/0167678 | A1 | 6/2018 | Clerx et al. |
| 2018/0189570 | A1* | 7/2018 | Paluri .................... G06F 18/24 |
| 2020/0107070 | A1 | 4/2020 | Lopatecki et al. |
| 2022/0256219 | A1 | 8/2022 | Saafi |

FOREIGN PATENT DOCUMENTS

| | | |
|---|---|---|
| KR | 20100117760 A | 11/2010 |
| KR | 101575779 B1 | 12/2015 |
| WO | WO-2017222902 A1 | 12/2017 |
| WO | WO-2022247894 A1 | 12/2022 |
| WO | WO-2023027754 A1 | 3/2023 |

OTHER PUBLICATIONS

Bhawan et al., "Recommendations on Review of Television Audience Measurement and Rating System in India," Website: www.trai.gov.in, New Delhi—110002, 67 pages.

Danaher et al., "Forcasting television ratings." International Journal of Forecasting, vol. 27, 2011.

Hsieh et al., "Predicting TV Audience Rating with Social Media," IJCNLP 2013 Workshop on Natural Language Processing for Social Media (SocialNLP), pp. 1-5, Nagoya, Japan, Oct. 14, 2013.

Scott Sereday and Jingsong Cui, "Using Machine Learning To Predict Future TV Ratings," Data Science, Nielsen, 11 pages.

Wang, "Forecast Model of TV Show Rating Based on Convolutional Neural Network," Research Article, Open Access, vol. 2021, Article ID 6694538.

* cited by examiner

ARTIFICIAL INTELLIGENCE TECHNIQUES FOR PROJECTING VIEWERSHIP USING PARTIAL PRIOR DATA SOURCES

CROSS-REFERENCE TO RELATED APPLICATIONS

This application is a continuation of U.S. patent application Ser. No. 18/299,349, titled "ARTIFICIAL INTELLIGENCE TECHNIQUES FOR PROJECTING VIEWERSHIP USING PARTIAL PRIOR DATA SOURCES" and filed on Apr. 12, 2023, the entirety of which is incorporated herein by reference.

TECHNICAL FIELD OF THE INVENTION

In general, the subject matter of this disclosure relates to determining when to broadcast video content and, more specifically, to projecting viewership of the broadcasted video content using partial data sources.

BACKGROUND

Viewership ratings are often used to measure the audience size and composition of television programming. An example of one such viewership rating is the Nielsen rating. In many cases, these ratings use a sample of households to estimate the total number of people watching a particular television program. This sampling technique is used to represent the overall population in terms of age, gender, and other demographic characteristics. In some cases, the sampled data is collected by installing electronic meters in households to track what channels are being watched and by whom. Each rating can provide several metrics, including the number of households that are tuning in to a program, the percentage of households with televisions that are watching a particular program, and the demographic breakdown of the audience (e.g., such as age, gender, and income). The ratings are used by television networks, advertisers, and producers to determine the popularity of a program and to make decisions about advertising rates, scheduling, and content. However, viewership ratings may only be calculated for select television channels during select time slots. As such, it is difficult to predict what the viewership rating will be for programming that is aired on a television channel and/or during a time slot where prior viewership ratings are not available.

SUMMARY OF THE INVENTION

In various examples, the subject matter of this disclosure relates to improved techniques for projecting viewership of broadcast video content using partial data sources.

At least one aspect of the present disclosure is directed to a computer-implemented method of dynamically determining when to broadcast video content. The method includes providing one or more content parameters corresponding to broadcasted video content to a machine learning (ML) model, wherein the ML model is at least one of a neural network ML model and a support vector ML model, iteratively training the ML model to identify relationships between the one or more content parameters and viewership ratings associated with the broadcasted video content, wherein such iterative training improves the accuracy of the ML model, receiving one or more content parameters corresponding to unaired video content, wherein the one or more content parameters include a desired platform for broadcasting the unaired video content, receiving viewership data associated with the unaired video content and/or the desired platform, providing the one or more content parameters and the viewership data to the trained ML model, and determining, via the trained ML model, a target time period for broadcasting the unaired video content on the desired platform that maximizes a projected viewership rating of the unaired video content.

In some embodiments, the method includes determining, via the trained ML model, the projected viewership rating of the unaired video content for the target time period. In some embodiments, the viewership data includes a viewership rating of the desired platform during at least one prior time period. In some embodiments, the viewership data includes a viewership rating of at least one platform other than the desired platform during at least one prior time period.

In some embodiments, in determining the target time period for broadcasting the unaired video content on the desired platform, the trained ML model is configured to project a viewership rating for similar content airing on at least one platform other than the desired platform during the target time period. In some embodiments, in determining the target time period for broadcasting the unaired video content on the desired platform, the trained ML model is configured to project a viewership rating for dissimilar content airing on at least one platform other than the desired platform during the target time period. In some embodiments, in determining the target time period for broadcasting the unaired video content on the desired platform, the trained ML model is configured to project a viewership rating for similar content airing on at least one platform other than the desired platform during a second time period that occurs after the target time period. In some embodiments, in determining the target time period for broadcasting the unaired video content on the desired platform, the trained ML model is configured to project a viewership rating for dissimilar content airing on at least one platform other than the desired platform during a second time period that occurs after the target time period.

In some embodiments, determining the target time period that maximizes the projected viewership rating of the unaired video content includes determining the target time period that maximizes the projected viewership rating for a particular demographic. In some embodiments, the method includes detecting a real-time change to the one or more content parameters, providing the real-time change to the trained ML model to improve the accuracy of the trained ML model, and updating, via the trained ML model, the target time period for broadcasting the unaired video content on the desired platform such that the projected viewership rating of the unaired video content remains maximized in view of the real-time change to the one or more content parameters. In some embodiments, detecting the real-time change to the one or more content parameters includes collecting and/or analyzing social media data related to the unaired video content.

In some embodiments, the viewership data includes at least one Nielson rating of broadcasted video content. In some embodiments, the projected viewership rating represents a projected number of viewers. In some embodiments, the target time period corresponds to a month of the year. In some embodiments, the target time period corresponds to a day of the week. In some embodiments, the target time period corresponds to a specific time slot on a specific day. In some embodiments, the target time period is based on a local time in a single region of a plurality of regions where the unaired video content is being broadcast. In some embodiments, the target time period is based on a local time in each region of a plurality of regions where the unaired content is being broadcast. In some embodiments, the unaired video content is pre-recorded content. In some embodiments, the unaired video content is live content.

Another aspect of the present disclosure is directed to a computer-implemented method of dynamically determining when to broadcast video content. The method includes providing one or more content parameters corresponding to broadcasted video content to a machine learning (ML) model, wherein the ML model is at least one of a neural network ML model and a support vector ML model, iteratively training the ML model to identify relationships between the one or more content parameters and viewership ratings associated with the broadcasted video content, wherein such iterative training improves the accuracy of the ML model, receiving one or more content parameters corresponding to unaired video content and a plurality of platforms for broadcasting the unaired video content, receiving viewership data associated with the unaired video content and/or the plurality of platforms, providing the one or more content parameters and the viewership data to the trained ML model, and determining, via the trained ML model, at least one target time period for broadcasting the unaired video content on at least one selected platform of the plurality of platforms that maximizes a projected viewership rating of the unaired video content.

In some embodiments, the method includes determining, via the trained ML model, the projected viewership rating of the unaired video content for the at least one target time period. In some embodiments, the at least one target time period includes a first target time period associated with a first selected platform of the plurality of platforms and a second target time period associated with a second selected platform of the plurality of platforms. In some embodiments, the first target time period and the second target time period are non-overlapping. In some embodiments, the first target time period and the second target time period are at least partially overlapping.

In some embodiments, at least one of the first selected platform and the second selected platform is a broadcast television platform. In some embodiments, at least one of the first selected platform and the second selected platform is an online streaming platform. In some embodiments, the unaired video content is to be broadcast on the first selected platform during the first target time period and re-broadcast on the second selected platform during the second target time period. In some embodiments, a first portion of the unaired video content is to be broadcast on the first selected platform during the first target time period and a second portion of the unaired video content is to be broadcast on the second selected platform during the second target time period. In some embodiments, the viewership data includes a viewership rating of the plurality of platforms during at least one prior time period. In some embodiments, the viewership data includes a viewership rating of at least one platform other than the plurality of platforms during at least one prior time period. In some embodiments, determining the at least one target time period for broadcasting the unaired video content on the at least one selected platform, the trained ML model is configured to project a viewership rating for similar content airing on at least one platform other than the at least one selected platform during the at least one target time period.

In some embodiments, in determining the at least one target time period for broadcasting the unaired video content on the at least one selected platform, the trained ML model is configured to project a viewership rating for dissimilar content airing on at least one platform other than the at least one selected platform during the target time period. In some embodiments, in determining the at least one time period for broadcasting the unaired video content on the at least one selected platform, the trained ML model is configured to project a viewership rating for similar content airing on at least one platform other than the at least one selected platform during a second time period that occurs after the at least one target time period. In some embodiments, in determining the at least one target time period for broadcasting the unaired video content on the at least one selected platform, the trained ML model is configured to project a viewership rating for dissimilar content airing on at least one platform other than the at least one selected platform during a second time period that occurs after the at least one target time period. In some embodiments, determining the at least one target time period that maximizes the projected viewership rating of the unaired video content includes determining the at least one target time period that maximizes the projected viewership rating for a particular demographic.

In some embodiments, the method includes detecting a real-time change to the one or more content parameters, providing the real-time change to the trained ML model to improve the accuracy of the trained ML model, and updating, via the trained ML model, the at least one target time period for broadcasting the unaired video content on the at least one selected platform such that the projected viewership rating of the unaired video content remains maximized in view of the real-time change to the one or more content parameters. In some embodiments, detecting the real-time change to the one or more content parameters includes collecting and/or analyzing social media data related to the unaired video content.

In some embodiments, the viewership data includes at least one Nielson rating of broadcasted video content. In some embodiments, the projected viewership rating represents a projected number of viewers. In some embodiments, the at least one target time period corresponds to at least one month of the year. In some embodiments, the at least one target time period corresponds to at least one day of the week. In some embodiments, the at least one target time period corresponds to at least one specific time slot on a specific day. In some embodiments, the at least one target time period is based on a local time in a single region of a plurality of regions where the unaired video content is being broadcast. In some embodiments, the at least one target time period is based on a local time in each region of a plurality of regions where the unaired content is being broadcast. In some embodiments, the unaired video content is pre-recorded content. In some embodiments, the unaired video content is live content.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

As discussed above, viewership ratings are often used to measure the audience size and composition of television programming. An example of one such viewership rating is the Nielsen rating. In many cases, these ratings use a sample of households to estimate the total number of people watching a particular television program. This sampling technique is used to represent the overall population in terms of age, gender, and other demographic characteristics. In some cases, the sampled data is collected by installing electronic meters in households to track what channels are being watched and by whom. Each rating can provide several metrics, including the number of households that are tuning in to a program, the percentage of households with televisions that are watching a particular program, and the demographic breakdown of the audience (e.g., such as age, gender, and income).

The ratings are used by television networks, advertisers, and producers to determine the popularity of a program and to make decisions about advertising rates, scheduling, and content. However, viewership ratings may only be calculated for select television channels during select time slots. As such, it is difficult to predict what the viewership rating will be for programming that is aired on a television channel and/or during a time slot where prior viewership ratings are not available. For example, viewership data may only be collected for specific television content (e.g., new, original, live, etc.). A particular television channel may only receive viewership ratings for the time slots (or periods) in which qualifying television content was aired. Television channels (or broadcasters) may experience difficulty in assessing how future content will fare during their time slots that typically do not receive viewership ratings. Likewise, advertisers may experience similar difficulties in assessing how advertisements would perform during these same unrated time slots.

Accordingly, improved techniques for projecting viewership of broadcast video content using partial data sources are provided herein. In at least one embodiment, content parameters corresponding to broadcasted video content are provided to a machine learning (ML) model. The ML model is iteratively trained to identify relationships between the content parameters and viewership ratings associated with the broadcasted video content. In some examples, the trained ML model determines a target time period for broadcasting unaired video content. The target time period is selected to maximize a projected viewership rating of the unaired video content. In some examples, the trained ML model determines a projected viewership rating of the unaired video content for the target time period.

Figure 1:
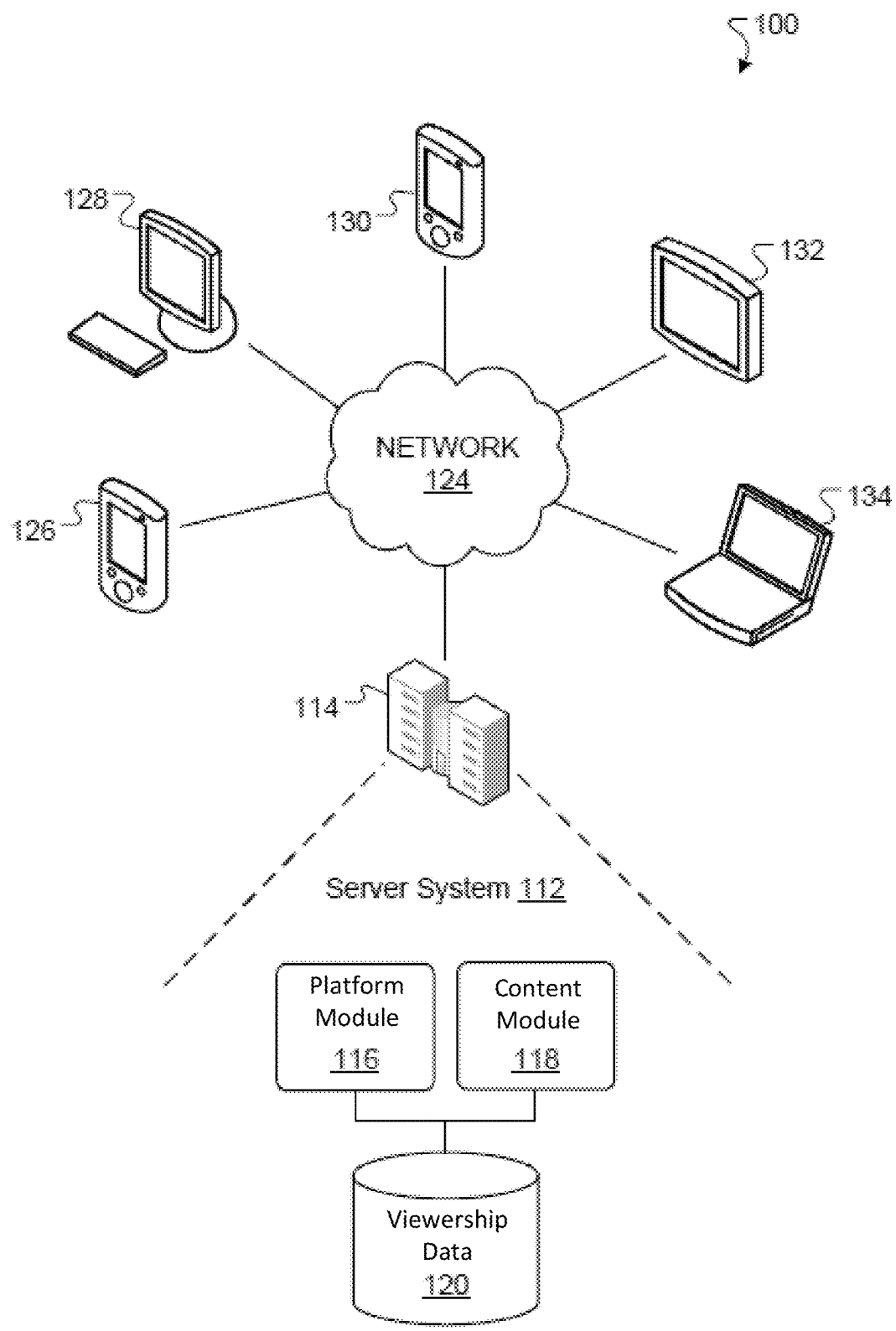
FIG. 1 is a schematic diagram of a system for projecting viewership of broadcast video content, in accordance with certain examples.

FIG. 1 illustrates an example system 100 for projecting viewership of broadcast video content (e.g., television shows, movies, sporting events, news, etc.). The broadcast video content may be live or pre-recorded content. A server system 112 provides functionality for projecting viewership of broadcast video content based on a variety of inputs, as described herein. The server system 112 includes software components and databases that can be deployed at one or more data centers 114 in one or more geographic locations, for example. The server system 112 software components can include, for example, a platform module 116 and a content module 118. The server system 112 can include subcomponents that can execute on the same or on different individual data processing apparatus. The server system 112 databases can include a viewership data 120 database, though it is understood that any number of databases can be included. The databases can reside in one or more physical storage systems. The software components and data will be further described below.

An application, such as, for example, a web-based or other software application can be provided as an end-user application to allow users to interact with the server system 112. The software application or components thereof can be accessed through a network 124 (e.g., the Internet) by users of client devices, such as a smart phone 126, a personal computer 128, a smart phone 130, a tablet computer 132, and a laptop computer 134. Other client devices are possible.

The platform module 116 can include software components that support the software application by, for example, projecting viewership of video content during specific time periods on a broadcast platform (e.g., television channel, streaming application, etc.). For example, the performer module 116 can receive input parameters for video content to be aired on the broadcast platform and, based on the parameters, project the viewership of the video content for one or more specific time periods (e.g., using a machine learning model). The platform module 116 can update the projected viewership based on a change to the input parameters. For example, a representative of the broadcast platform can use the software application to access the platform module 116 and determine a projected viewership for the video content during one or more time periods (or time slots) on the broadcast platform.

Similarly, the content module 118 can include software components that support the software application by, for example, projecting viewership of video content during specific time periods on one or more broadcast platforms (e.g., television channels, streaming applications, etc.). For example, the content module 118 can receive input parameters for video content to be aired on at least one of a plurality of broadcast platforms and, based on the parameters, project the viewership of the video content for one or more specific time periods on one or more broadcast platforms (e.g., using a machine learning model). The content module 118 can update the schedule based on a change to the input parameters. For example, a representative of the content can use the software application to access the content module 118 and determine a projected viewership for the video content during one or more time periods (or time slots) on one or more broadcast platforms.

The viewership data database 120 can store and provide data for the software application and/or can provide data to or receive data from the platform model 116 and the content module 118. The data can include, for example, information related to broadcast content scheduling and viewership ratings. For example, the viewership data can include information related to past broadcast content (e.g., content that has already been aired on one or more broadcast platforms). In some examples, the past broadcast content information includes a description of the content, the length of the content, and the scheduling of the content (e.g., the time period(s) the content was aired and the platform(s) the content was aired on), or any combination thereof. In some examples, the viewership data includes viewership ratings (e.g., Nielsen ratings) associated with the past broadcast content.

Similarly, the viewership data can include information related to future broadcast content (e.g., content that is scheduled to be aired on one or more broadcast platforms). In some examples, the future broadcast content information includes a description of the content, the length of the content, and the scheduling of the content (e.g., the time period(s) the content is scheduled to be aired and the platform(s) the content is scheduled to be aired on), or any combination thereof. In some examples, the viewership data includes projected viewership ratings associated with the future broadcast content. For example, the projected viewership rating for an upcoming Super Bowl may be the viewership rating from the prior year's Super Bowl. Likewise, the projected viewership rating for an upcoming tournament on a golf tour may be the viewership rating from the previous tournament on the golf tour (or the prior year's rendition of the same tournament). In some examples, the projected viewership rating for future content is adjusted based on different characteristics of the content (e.g., the teams playing in the Super Bowl, the location of the golf tournament, etc.). In some examples, the projected viewership ratings are determined using a machine learning model, as described in greater detail herein.

Figure 2:
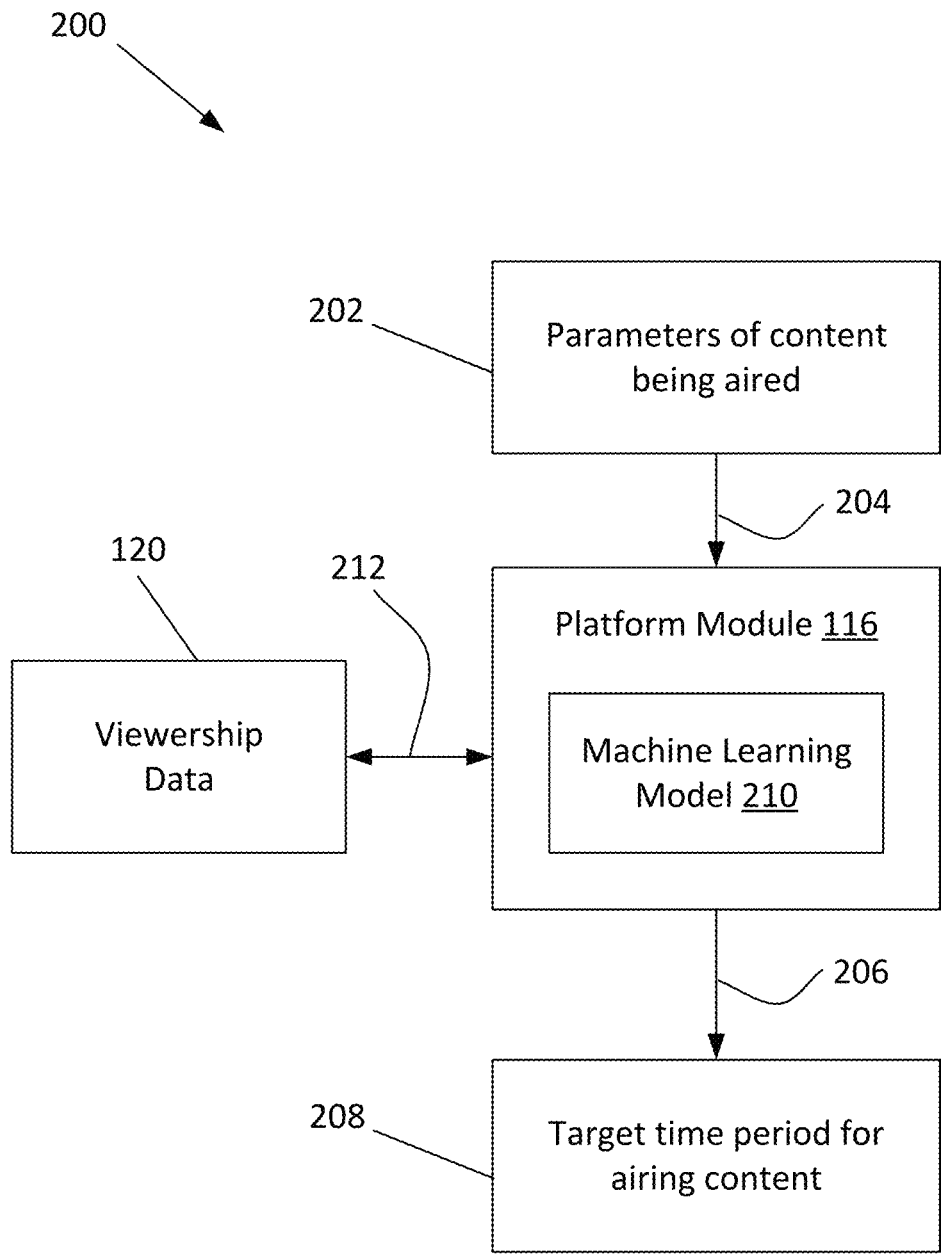
FIG. 2 is a block diagram of a method of determining a target time period for airing video content on a desired broadcast platform, in accordance with certain examples.

FIG. 2 depicts an example method 200 in which the platform module 116 is used to project viewership of video content on a broadcast platform. In one example, the platform module 116 determines a target time period for airing the video content to maximize viewership. Parameters 202 for video content to be aired are provided (step 204) as inputs to the platform module 116. Such input parameters 202 can be, include, or relate to, for example: a description of the content, a cast of the content, a target demographic of the content, a genre of the content, a length of the content, a number of advertisements or advertising opportunities in the content, a desired date for airing the content, a desired time or time frame for airing the content, or any combination thereof. In some examples, the input parameters 202 may include the video content itself. The input parameters 202 can be manually entered by users, and/or can be retrieved from other sources (e.g., a database or website operated by the broadcast platform).

Similarly, viewership data 212 associated with the unaired video content is provided to the platform module 116 from the viewership data database 120. In some examples, the viewership data 212 is requested by the platform module 116 based on the input parameters 202. In some examples, the viewership data 212 includes known viewership ratings of previously broadcasted content. However, it should be appreciated that viewership ratings may not be available for specific time slots on specific platforms. In certain scenarios, there may be limited or no known viewership ratings for a desired time slot on a specific platform. As such, the viewership data 212 may represent a partial data source that includes information representative of broadcast content that is related to the unaired video content and/or the platform. For example, the viewership data 212 may include information relative to content already broadcasted on the platform (or other platforms), content scheduled to be broadcasted before or during the same time frame as the unaired video content (e.g., on other platforms), and content scheduled to be broadcasted after the time frame of the unaired video content on the platform (or other platforms).

In some examples, the viewership data 212 includes a viewership rating of the platform during a time period prior to the time frame of the unaired video content. For example, if the video content is to be aired on platform A on a Thursday from 4-8 PM, the viewership data 212 may include viewership ratings of platform A that are available from prior broadcasts on Thursdays from 4-8 PM. Likewise, if the video content is to be aired on platform A on a Thursday from 4-8 PM, the viewership data 212 may include viewership ratings of platform A that are available from prior broadcasts on different days of the week (e.g., a Tuesday from 4-8 PM). Similarly, if the video content is to be aired on platform A on Thursday from 4-8 PM, the viewership data 212 may include viewership ratings of platform A that are available from prior broadcasts at different times of the day (e.g., a Thursday from 8-10 PM).

In some examples, the viewership data 212 includes a viewership rating of at least other platform during a time period prior to the time frame of the unaired video content. For example, if the video content is to be aired on platform A on a Thursday from 4-8 PM, the viewership data 212 may include viewership ratings of platforms B, C, D, etc. that are available from prior broadcasts on Thursdays from 4-8 PM. Likewise, if the video content is to be aired on platform A on a Thursday from 4-8 PM, the viewership data 212 may include viewership ratings of platforms B, C, D, etc. that are available from prior broadcasts on different days of the week (e.g., a Tuesday from 4-8 PM). Similarly, if the video content is to be aired on platform A on Thursday from 4-8 PM, the viewership data 212 may include viewership ratings of platforms B, C, D, etc. that are available from prior broadcasts at different times of the day (e.g., a Thursday from 8-10 PM).

In the depicted example, the platform module 116 uses the input parameters 202 and the viewership data 212 to determine and output (step 206) a target time period for airing the video content. The target time period can be or include, for example, a time slot that optimizes (e.g., maximizes) a projected viewership of the video content. In some examples, the platform module 116 is configured to determine a projected viewership rating of the video content for the target time period. In one example, the target time period is selected to maximize the projected viewership rating of a particular demographic (e.g., the target demographic of the content). The target time period may correspond to a month, a day, or a specific time slot on a day (e.g., 7-8 PM on Monday). In some examples, the target time period is based on the local time in a single region. For example, if the target time period is 6-8 PM Eastern time, the content will be broadcast synchronously at 6-8 PM on the east coast and 3-5 PM on the west coast. In other examples, the target time period is based on the local time in each broadcast region. For example, if the target time period is 6-8 PM, the content will be broadcast asynchronously at 6-8 PM on the east coast and 6-8 PM on the west coast. In certain examples, the target time period corresponds to a recurring time period (e.g., every Tuesday at 7-8 PM). In some examples, the target time period includes multiple time periods (e.g., Tuesdays and Thursdays at 7-8 PM).

In some examples, the platform module 116 includes or utilizes a machine learning model 210 or other predictive tool for determining the target time period and the projected viewership. In general, any suitable machine learning technique can be used, such as, for example: a gradient boosted random forest, a regression, a neural network, a decision tree, a support vector machine, a Bayesian network, other type of technique. The machine learning model 210 can be trained using a set of training data. The training data can be or include, for example, historical data from previously broadcasted video content. Such data can include information related to the input parameters 202 (e.g., the description of the content, the cast of the content, the target demographic of the content, the genre of the content, the length of the content, the number of advertisements in the content, the aired date of the content, the platform that aired the content, etc.) and viewership ratings of the content (e.g., Nielsen ratings). In general, the machine learning model 210 can be trained to recognize how to optimize or maximize the projected viewership of content based on a given set of input parameters. Once trained, the machine learning model 210 can receive the input parameters 202 as input, determine a target time period for airing the content, and provide the target time period 208 as output. To determine the target time period, the platform module 116 and/or the machine learning model 210 can determine the projected viewership (or viewership rating) of the content.

In some examples, after the target time period 208 has been determined, the platform module 116 can receive one or more updates or changes to the input parameters 202. These parameter changes can include, for instance, changes to the description of the content, the cast of the content, the target demographic of the content, the genre of the content, the length of the content, the number of advertisements or advertising opportunities in the content, the desired date for airing the content, the desired time or time frame for airing the content, or any combination thereof. In some examples, the parameter changes may indicate a change to one or more content attributes. Such attributes may include the teams or individuals participating in a sporting event, the weather conditions of an outdoor event, etc. The platform module 116 can then update the target time period 208 in response to the parameter changes. For example, the platform module 116 may adjust the target time period 208 such that the projected viewership of the unaired video content remains maximized in view of the change to the input parameters. In some examples, adjusting the target time period 208 may result in at least a portion of live video content being broadcast with a delay. The platform module 116 can search for and/or receive the parameter changes on a regular schedule or at periodic intervals (e.g., every hour, day, week, or month). Alternatively or additionally, the platform module 116 can receive parameter changes when prompted to do so by a user. For instance, the user can use a client device to instruct the platform module 116 to retrieve the parameter changes and/or can enter the parameter changes manually. In some examples, the target time period 208 can be updated based on real-time data (e.g., real-time parameter changes) and, in some instances, the target time period 208 can be dynamically updated in response to changes in this data.

Similarly, after the target time period 208 has been determined, the platform module 116 can receive one or more updates or changes to the viewership data 212. These data updates can include, for instance, updates to information relative to content scheduled to be broadcasted before the time frame of the unaired video content on the platform (or other platforms), during the same time frame as the unaired video content (e.g., on other platforms), and content scheduled to be broadcasted after the time frame of the unaired video content on the platform (or other platforms). The platform module 116 can then update the target time period 208 in response to the parameter changes. For example, the platform module 116 may adjust the target time period 208 such that the projected viewership of the unaired video content remains maximized in view of the change to the viewership data 212. In some examples, adjusting the target time period 208 may result in at least a portion of live video content being broadcast with a delay. The platform module 116 can request to receive the viewership data changes from the viewership data database 120 on a regular schedule or at periodic intervals (e.g., every hour, day, week, or month). Alternatively or additionally, the platform module 116 can receive viewership data changes when prompted to do so by a user. For instance, the user can use a client device to instruct the platform module 116 to retrieve the viewership data changes and/or can enter the changes manually. In some examples, the target time period 208 can be updated based on real-time data (e.g., real-time viewership data changes) and, in some instances, the target time period 208 can be dynamically updated in response to changes in this data.

In some examples, real-time changes to the input parameters 202 and/or the viewership data 212 are collecting and/or analyzed using social media data related to the unaired video content. Such data can be mined or analyzed to determine how popular the unaired content is expected to be, changes to the target audience, etc. In some examples, such data can be mined or analyzed to determine changes in attributes of the content. For example, if the unaired content is a golf tournament, such data can be analyzed to determine when the most popular golfers are playing in order to ensure maximum coverage of those players.

Figure 3:
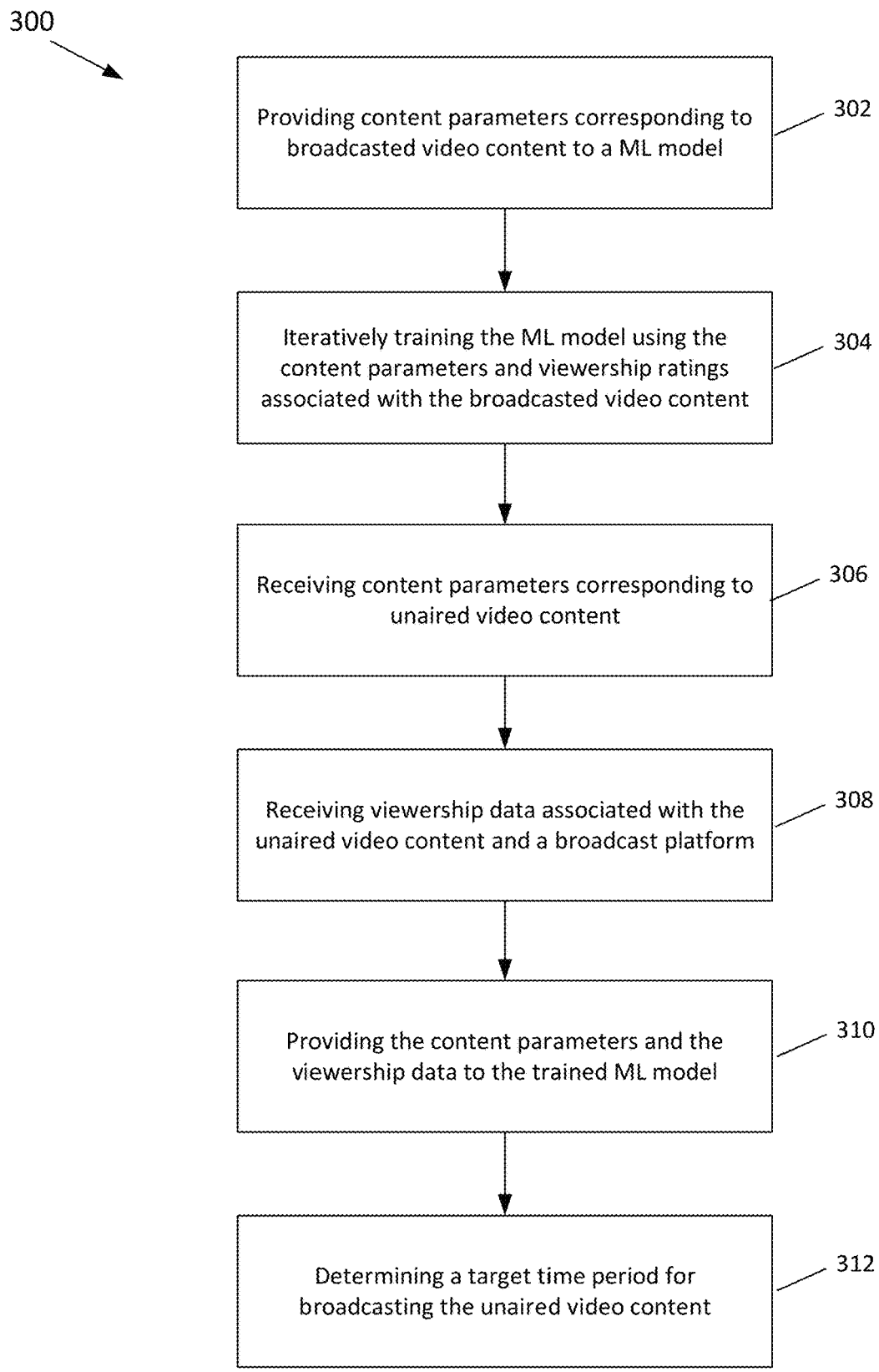
FIG. 3 is a flowchart of a method of determining a target time period for airing video content on a desired broadcast platform, in accordance with certain examples.

FIG. 3 is a flowchart of a computer-implemented method 300 of dynamically determining a target time period for airing broadcast video content, in accordance with certain embodiments. In some examples, the method 300 is configured to be carried out by the platform module 116.

At block 302, one or more content parameters corresponding to broadcasted video content are provided to an ML model of the platform module 116 (e.g., ML model 210).

At block 304, the ML model 210 is iteratively trained to identify relationships between the content parameters and viewership ratings associated with the broadcasted video content. In some examples, the iterative training improves the accuracy of the ML model 210. For example, the ML model 210 may be trained using a first data set including historical broadcast information. One or more parameters (e.g., weights) may be adjusted based on a result of the first round of training. The ML model 210 is then trained using a second data set including historical broadcast information to improve the accuracy of the ML model 210. It should be appreciated that the ML model 210 may be trained for more than two rounds using more than two training data sets. In some examples, the accuracy of the ML model 210 is assessed during training by comparing a projected viewership of content to a known (or expected) viewership rating.

At block 306, the platform module 116 receives one or more content parameters corresponding to unaired video content. In some examples, the content parameters include a desired platform for broadcasting the unaired video content (e.g., a television channel, a website, a streaming application, etc.).

At block 308, the platform module 116 receives viewership data associated with the unaired video content and/or the desired broadcast platform.

At block 310, the one or more content parameters and the viewership data are provided to the trained ML model 210.

At block 312, the trained ML model 210 determines a target time period for broadcasting the unaired video content on the desired platform. In some examples, the target time period is selected to maximize a projected viewership rating of the unaired video content. In some examples, the target time period is selected to maximize a projected viewership rating for a particular demographic (e.g., a specific gender, a specific age range, golf fans, sports fans, etc.).

In some examples, when determining the target time period, the trained ML model 210 is configured to project a viewership rating for similar content airing on at least one platform other than the desired platform during the target time period. In this context, "similar" refers to content that shares at least a partially overlapping viewership base (or target audience). For example, if the unaired video content is a sporting event to be aired via platform A on Monday at 8-10 PM, the trained ML model may project a viewership rating of a different sporting event to be aired via platform B at the same time (or at least overlapping in time). Given that the sporting event on platform A is likely to have a similar viewership base as the sporting event on platform B, the projected viewership rating for platform B may be used by the ML model 210 to optimize the target time period for platform A.

Similarly, the trained ML model 210 may be configured to project a viewership rating for dissimilar content airing on at least one platform other than the desired platform during the target time period. In this context, "dissimilar" refers to content that has a minimal or insignificant overlap. For example, if the unaired video content is a sporting event to be aired via platform A on Monday at 8-10 PM, the trained ML model may project a viewership rating of a sitcom to be aired via platform B at the same time (or at least overlapping in time).

In some examples, an index may be assigned to content indicating the level of similarity to the unaired video content. In one example, a higher index indicates a higher level of similarity (e.g., a higher audience overlap) and a lower index indicates a lower level of similarity (e.g., a lower audience overlap). The similarity indexes may be manually assigned by the user and/or automatically assigned by the ML model 210 (e.g., based on the content parameters and the viewership data). In some examples, the ML model 210 is configured to apply the similarity indexes as a weighting criteria when projecting the viewership rating of the unaired video content.

In some examples, when determining the target time period, the trained ML model 210 is configured to project a viewership rating for similar content airing on at least one platform other than the desired platform during a second time period that occurs after the target time period. For example, if the unaired video content is a sporting event to be aired via platform A on Monday at 8-10 PM, the trained ML model may project a viewership rating of a different sporting event to be aired via platform B on Wednesday at 6-8 PM. Given that the sporting event on platform A is likely to have a similar viewership base as the sporting event on platform B, the projected viewership rating for platform B may be used by the ML model 210 to optimize the target time period for platform A. Likewise, the trained ML model 210 may be configured to project a viewership rating for dissimilar content airing on at least one platform other than the desired platform during the target time period. For example, if the unaired video content is a sporting event to be aired via platform A on Monday at 6-8 PM, the trained ML model may project a viewership rating of a sitcom to be aired via platform B on the same day at 8-10 PM.

It should be appreciated that the trained ML model 210 may project viewership ratings for similar and/or dissimilar content that is scheduled to air on the platform (or other platforms) prior to the target time period.

Figure 4:
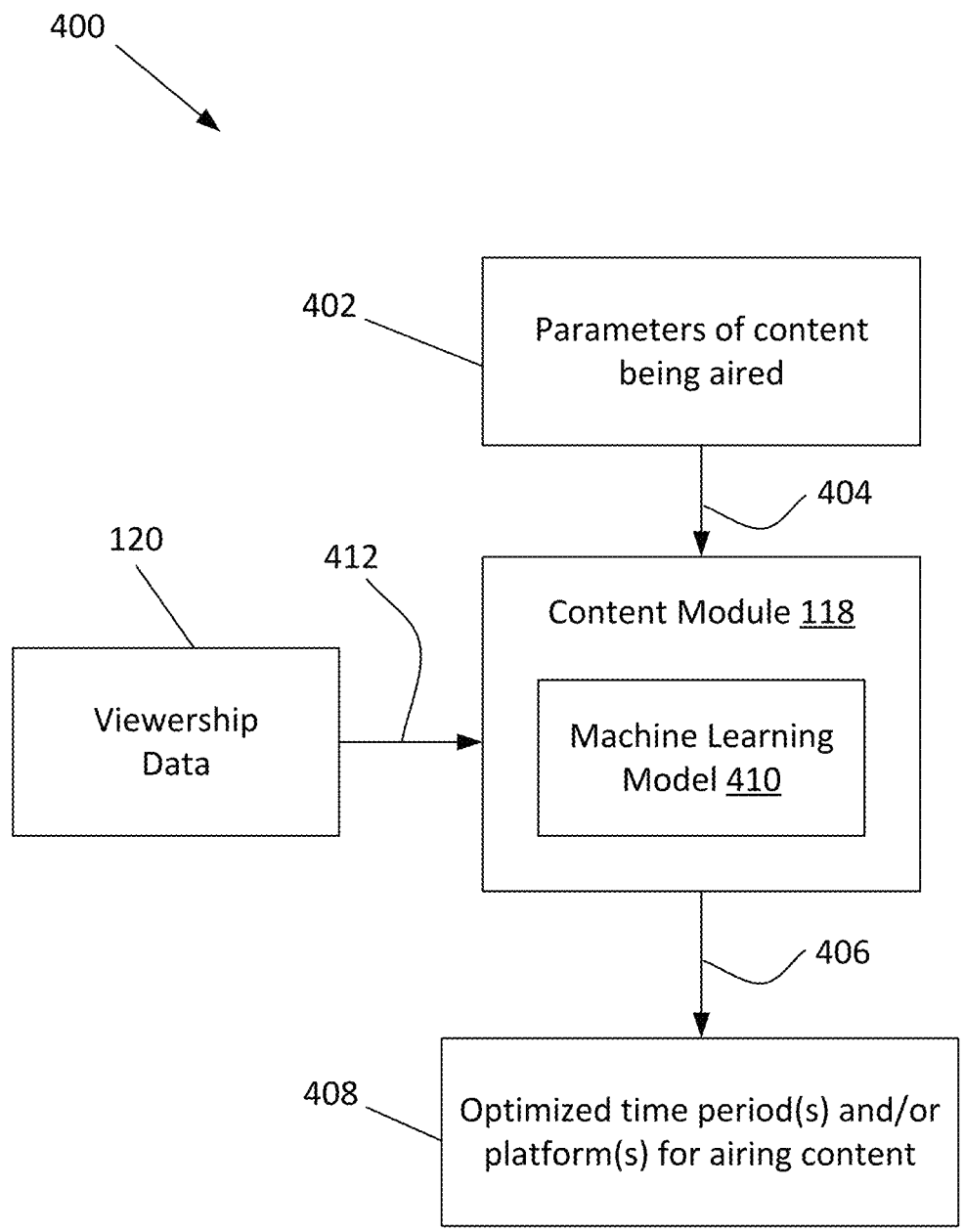
FIG. 4 is a block diagram of a method of determining a target time periods for airing video content on broadcast platforms, in accordance with certain examples.

FIG. 4 depicts an example method 400 in which the content module 118 is used to project viewership of video content on broadcast platforms. In one example, the content module 118 determines a target time period for airing the video content to maximize viewership. Parameters 402 for video content to be aired are provided (step 404) as inputs to the content module 118. Such input parameters 402 can be substantially similar to the input parameters 202 of method 200 of FIG. 2. In some examples, the input parameters 402 include a plurality of platforms for broadcasting the video content. Such platforms may include platforms operated by a common broadcast entity (e.g., a television channel, a website, a streaming application, etc.). Alternatively, the plurality of platforms operated by different broadcast entities (e.g., two different television channels). In some examples, the rights to air video content may be split amongst different broadcast entities. For example, a first broadcast entity may own the rights to air a first portion of a golf tournament and a second broadcast entity may own the rights to broadcast the remaining portion of the golf tournament. Such content portions may be assigned to different days of the broadcast or different times of the same day. The input parameters 402 can be manually entered by users, and/or can be retrieved from other sources (e.g., databases or websites operated by the broadcast platforms).

Similarly, viewership data 412 associated with the unaired video content is provided to the content module 118 from the viewership data database 120. In some examples, the viewership data 412 is requested by the content module 118 based on the input parameters 402. In some examples, the viewership data 412 can be substantially similar to the viewership data 212 of method 200 of FIG. 2. In some examples, the viewership data 212 includes viewership ratings of the different platforms during a time period prior to the time frame of the unaired video content. For example, if the video content is to be aired on platform A, B, or C on a Thursday from 4-8 PM, the viewership data 212 may include viewership ratings of platforms A, B, and C that are available from prior broadcasts on Thursdays from 4-8 PM. Likewise, if the video content is to be aired on platform A, B, or C on a Thursday from 4-8 PM, the viewership data 212 may include viewership ratings of platforms A, B, and C that are available from prior broadcasts on different days of the week (e.g., a Tuesday from 4-8 PM). Similarly, if the video content is to be aired on platforms A, B, or C on Thursday from 4-8 PM, the viewership data 212 may include viewership ratings of platforms A, B, and C that are available from prior broadcasts at different times of the day (e.g., a Thursday from 8-10 PM).

In some examples, the viewership data 212 includes a viewership rating of at least other platform (e.g., not included in the plurality of platforms) during a time period prior to the time frame of the unaired video content. For example, if the video content is to be aired on platform A, B, or C on a Thursday from 4-8 PM, the viewership data 212 may include viewership ratings of platforms D, E, F, etc. that are available from prior broadcasts on Thursdays from 4-8 PM. Likewise, if the video content is to be aired on platform A, B, or C on a Thursday from 4-8 PM, the viewership data 212 may include viewership ratings of platforms D, E, F, etc. that are available from prior broadcasts on different days of the week (e.g., a Tuesday from 4-8 PM). Similarly, if the video content is to be aired on platform A, B, or C on Thursday from 4-8 PM, the viewership data 212 may include viewership ratings of platforms D, E, F, etc. that are available from prior broadcasts at different times of the day (e.g., a Thursday from 8-10 PM).

In the depicted example, the content module 118 uses the input parameters 402 and the viewership data 412 to determine and output (step 406) at least one target time period for airing the video content on at least one platform. The target time period(s) can be or include, for example, time slots that optimize (e.g., maximize) a total projected viewership of the video content. In some examples, the content module 118 is configured to determine a projected viewership rating of the video content for each target time period. In one example, the target time periods are selected to maximize the projected viewership rating of a particular demographic (e.g., the target demographic of the content).

In some examples, the content module 118 includes or utilizes a machine learning model 410 or other predictive tool for determining the target time period and the projected viewership. In general, any suitable machine learning technique can be used, such as, for example: a gradient boosted random forest, a regression, a neural network, a decision tree, a support vector machine, a Bayesian network, other type of technique. The machine learning model 410 can be trained using a set of training data. The training data can be or include, for example, historical data from previously broadcasted video content. Such data can include information related to the input parameters 402 (e.g., information related to different broadcast platforms) and viewership ratings of the content (e.g., Nielsen ratings). In general, the machine learning model 410 can be trained to recognize how to optimize or maximize the projected viewership of content based on a given set of input parameters. Once trained, the machine learning model 410 can receive the input parameters 402 as input, determine at least one target time period for airing the content, and provide the target time period(s) 408 and the corresponding platform(s) as output. To determine the target time period(s), the content module 118 and/or the machine learning model 210 can determine the projected viewership (or viewership rating) of the content.

In one examples, the content module 118 is configured to provide a single target time period for airing the video content on a single platform selected from the plurality of platforms. In some examples, multiple target time periods are provided for airing different portions of the video content on a single platform selected from the plurality of platforms. In other examples, multiple target time periods are provided for airing (and re-airing) the video content on a single platform selected from the plurality of platforms. Alternatively, multiple target time periods may be provided for airing (and re-airing) the video content on multiple platforms selected from the plurality of platforms.

In some examples, multiple target time periods are provided for airing different portions of the video content on multiple platforms selected from the plurality of platforms. For example, the content module 118 may provide a first target time period associated with a first selected platform of the plurality of platforms and a second target time period associated with a second selected platform of the plurality of platforms. In some examples, the first target time period and the second target time period are non-overlapping; however, in other examples, the first target time period and the second target time period may be at least partially overlapping. It should be appreciated that the selected platforms may be the same platform type or different platform types. For example, the first and second selected platforms may be different television channels. Likewise, the first selected platform may be a streaming application or a website and the second selected platform may be a television station.

In some examples, after the target time periods 408 and the corresponding platforms have been determined, the content module 118 can receive one or more updates or changes to the input parameters 402. These parameter changes can include, for instance, changes to the description of the content, a cast of the content the target demographic of the content, the genre of the content, the length of the content, the number of advertisements or advertising opportunities in the content, the desired date for airing the content, the desired time or time frame for airing the content, or any combination thereof. Likewise, the parameter changes may include a change to the plurality of platforms (e.g., a platform is added or removed). In some examples, the parameter changes may indicate a change to one or more content attributes. Such attributes may include the teams or individuals participating in a sporting event, the weather conditions of an outdoor event, etc. The content module 118 can then update the target time periods 408 and/or the corresponding platforms in response to the parameter changes. For example, the content module 118 may adjust the target time periods 408 and/or the corresponding platforms such that the projected viewership of the unaired video content remains maximized in view of the change to the input parameters. In some examples, adjusting the target time periods 408 may result in at least a portion of live video content being broadcast with a delay. The content module 118 can search for and/or receive the parameter changes on a regular schedule or at periodic intervals (e.g., every hour, day, week, or month). Alternatively or additionally, the content module 118 can receive parameter changes when prompted to do so by a user. For instance, the user can use a client device to instruct the content module 118 to retrieve the parameter changes and/or can enter the parameter changes manually. In some examples, the target time periods 408 and/or the corresponding platforms can be updated based on real-time data (e.g., real-time parameter changes) and, in some instances, the target time periods 408 and/or the corresponding platforms can be dynamically updated in response to changes in this data.

Similarly, after the target time periods 408 and the corresponding platforms have been determined, the content module 118 can receive one or more updates or changes to the viewership data 412. These data updates can include, for instance, updates to information relative to content scheduled to be broadcasted during the same time frame as the unaired video content (e.g., on other platforms), and content scheduled to be broadcasted after the time frame of the unaired video content on the corresponding platforms (or other platforms). The content module 118 can then update the target time periods 408 and/or the corresponding platforms in response to the parameter changes. For example, the content module 118 may adjust the target time periods 408 and/or the corresponding platforms such that the projected viewership of the unaired video content remains maximized in view of the change to the viewership data 412. In some examples, adjusting the target time periods 408 may result in at least a portion of live video content being broadcast with a delay. The content module 118 can request to receive the viewership data changes from the viewership data database 120 on a regular schedule or at periodic intervals (e.g., every hour, day, week, or month). Alternatively or additionally, the content module 118 can receive viewership data changes when prompted to do so by a user.

For instance, the user can use a client device to instruct the content module 118 to retrieve the viewership data changes and/or can enter the changes manually. In some examples, the target time periods 408 and/or the corresponding platforms can be updated based on real-time data (e.g., real-time viewership data changes) and, in some instances, the target time periods 408 and/or the corresponding platforms can be dynamically updated in response to changes in this data.

In some examples, real-time changes to the input parameters 402 and/or the viewership data 412 are collecting and/or analyzed using social media data related to the unaired video content. Such data can be mined or analyzed to determine how popular the unaired content is expected to be, changes to the target audience, etc. In some examples, such data can be mined or analyzed to determine changes in attributes of the content. For example, if the unaired content is a golf tournament, such data can be analyzed to determine when the most popular golfers are playing in order to ensure maximum coverage of those players.

Figure 5:
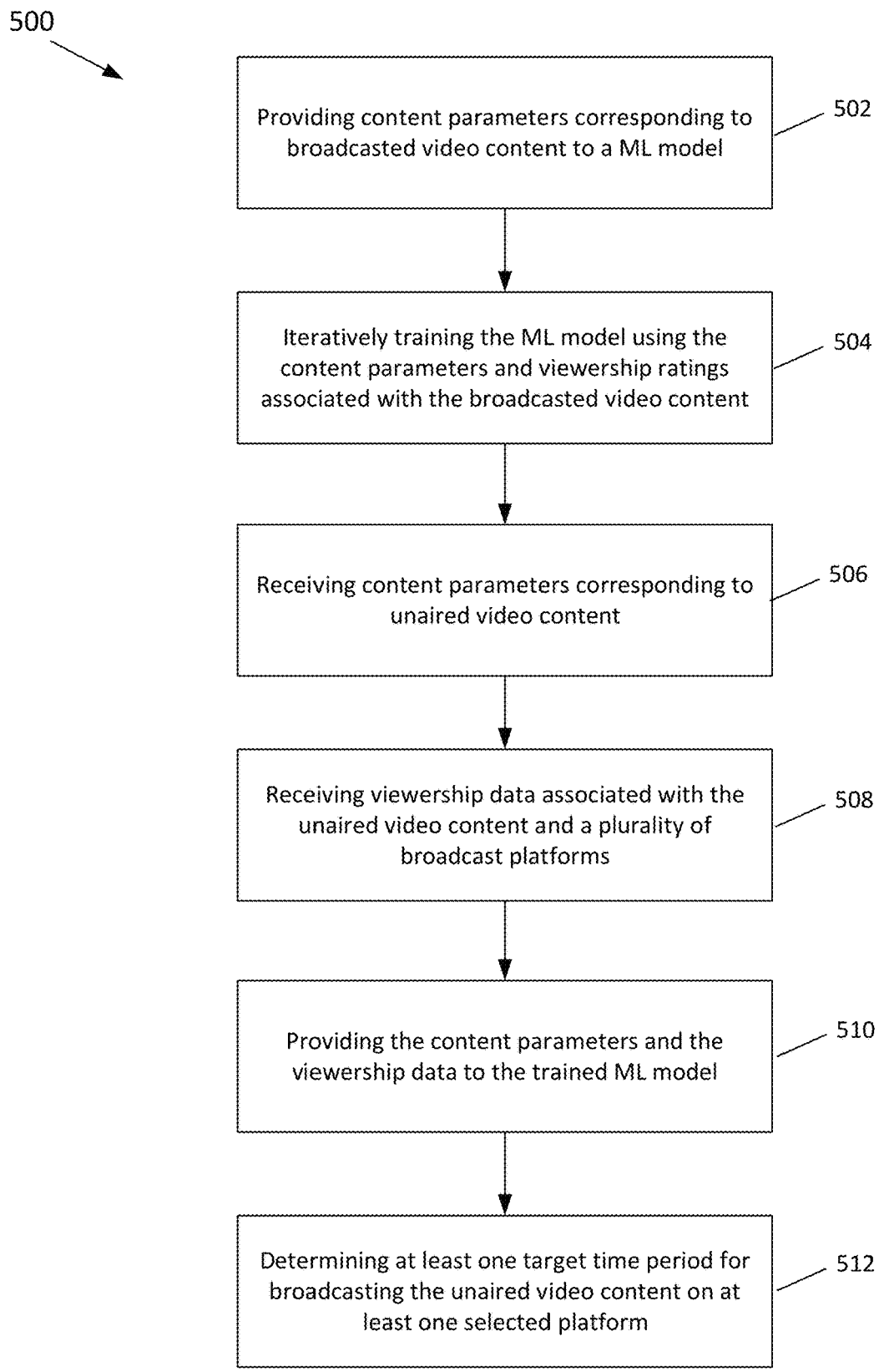
FIG. 5 is a flowchart of a method of determining a target time periods for airing video content on broadcast platforms, in accordance with certain examples.

FIG. 5 is a flowchart of a computer-implemented method 500 of dynamically determining at least one target time period for airing broadcast video content, in accordance with certain embodiments. In some examples, the method 500 is configured to be carried out by the content module 118.

At block 502, one or more content parameters corresponding to broadcasted video content are provided to an ML model of the content module 118 (e.g., ML model 410).

At block 504, the ML model 410 is iteratively trained to identify relationships between the content parameters and viewership ratings associated with the broadcasted video content. In some examples, the iterative training improves the accuracy of the ML model 410. For example, the ML model 410 may be trained using a first data set including historical broadcast information. One or more parameters (e.g., weights) may be adjusted based on a result of the first round of training. The ML model 410 is then trained using a second data set including historical broadcast information to improve the accuracy of the ML model 410. It should be appreciated that the ML model 410 may be trained for more than two rounds using more than two training data sets. In some examples, the accuracy of the ML model 410 is assessed during training by comparing a projected viewership of content to a known (or expected) viewership rating.

At block 506, the content module 118 receives one or more content parameters corresponding to unaired video content. In some examples, the content parameters include a plurality of platforms for broadcasting the unaired video content (e.g., one or more television channels, a website, a streaming application, etc.).

At block 508, the content module 118 receives viewership data associated with the unaired video content and/or the plurality of platforms.

At block 510, the one or more content parameters and the viewership data are provided to the trained ML model 410.

At block 512, the trained ML model 410 determines at least one target time period for broadcasting the unaired video content on at least one selected platform. In some examples, the target time periods are selected to maximize a total projected viewership rating of the unaired video content. In some examples, the target time period is selected to maximize a projected viewership rating for a particular demographic (e.g., a specific gender, a specific age range, golf fans, sports fans, etc.).

In some examples, when determining the target time period, the trained ML model 410 is configured to project a viewership rating for similar content airing on at least one platform other than the selected platforms during the target time period. For example, if platform A is to air a first portion of a sporting event from 8-10 AM on Saturday and platform B is to air a second portion of the sporting event from 10 AM-3 PM, the trained ML model may project a viewership rating of a different sporting event to be aired via platforms C, D, E, etc. at the same times (or at least overlapping in time). Given that the sporting event on platforms A, B is likely to have a similar viewership base as the sporting event on platforms C, D, E, etc., the projected viewership rating for platforms C, D, E, etc. may be used by the ML model 410 to optimize the target time periods for platforms A, B.

Similarly, the trained ML model 410 may be configured to project a viewership rating for dissimilar content airing on at least one platform other than the selected platforms during the target time periods. For example, if platform A is to air a first portion of a sporting event from 8-10 AM on Saturday and platform B is to air a second portion of the sporting event from 10 AM-3 PM, the trained ML model may project a viewership rating of a sitcom to be aired via platforms C, D, E, etc. at the same times (or at least overlapping in time).

In some examples, an index may be assigned to content indicating the level of similarity to the unaired video content. In one example, a higher index indicates a higher level of similarity (e.g., a higher audience overlap) and a lower index indicates a lower level of similarity (e.g., a lower audience overlap). The similarity indexes may be manually assigned by the user and/or automatically assigned by the ML model 410 (e.g., based on the content parameters and the viewership data). In some examples, the ML model 410 is configured to apply the similarity indexes as a weighting criteria when projecting the viewership ratings of the unaired video content.

In some examples, when determining the target time periods, the trained ML model 410 is configured to project a viewership rating for similar content airing on at least one platform other than the selected platforms during a second time period that occurs after the target time periods. For example, if platform A is to air a first portion of a sporting event from 8-10 AM on Saturday and platform B is to air a second portion of the sporting event from 10 AM-3 PM, the trained ML model may project a viewership rating of a different sporting event to be aired via platforms C, D, E, etc. on Saturday at 6-8 PM. Given that the sporting event on platforms A, B is likely to have a similar viewership base as the sporting event on platforms C, D, E, etc., the projected viewership rating for platforms C, D, E, etc. may be used by the ML model 410 to optimize the target time periods for platforms A, B. Likewise, the trained ML model 410 may be configured to project a viewership rating for dissimilar content airing on at least one platform other than the selected platforms during the target time periods. For example, if platform A is to air a first portion of a sporting event from 8-10 AM on Saturday and platform B is to air a second portion of the sporting event from 10 AM-3 PM, the trained ML model may project a viewership rating of a sitcom to be aired via platforms C, D, E, etc. on Saturday at 6-8 PM.

It should be appreciated that the trained ML model 410 may project viewership ratings for similar and/or dissimilar content that is scheduled to air on the platforms (or other platforms) prior to the target time period.

In some examples, one of the selected platforms may have a higher viewership potential than another selected platform. As such, for sporting event such as a golf tournament, the target time periods may be arranged such that the most popular players are broadcasted on the platform with the higher viewership potential. For example, a portion of the broadcast covering less popular players (or less competitive players) may be assigned to a first platform (e.g., a streaming application) and a subsequent portion of the broadcast may be elevated to a second platform with greater visibility (e.g., a television channel). Alternatively, at least a portion of the coverage of the most popular players (or most competitive players) may be assigned to the lower tier platform in an effort to encourage viewers to use both platforms. In some examples, different portions of the broadcast may be aired on different platforms simultaneously. For example, given the number of players in a golf tournament, it can be difficult to provide adequate coverage of all players on a single broadcast (e.g., airing on a single platform). As such, different portions of the broadcast may be split across different platforms to maximize the coverage of each player. In one example, half the field of a golf tournament may be assigned to a first platform and the remaining half to a second platform. Such a configuration allows each viewer to follow their favorite players more closely, which may increase the total viewership of the combined broadcast.

In some examples, the coverage of individual players may be dynamically reassigned across the selected platforms. For example, players in the top 20 of a tournament may be assigned to a first platform (e.g., a television channel) and the remaining players may be assigned to a second platform (e.g., a streaming application). As players fall out of the top 20, their corresponding coverage may be transferred from the first platform to the second platform. Likewise, as players move into the top 20, their corresponding coverage may be transferred from the second platform to the first platform. This dynamic assignment of coverage may improve the viewing experience, attracting new viewers and extending the viewership period of existing viewers. In some examples, rankings may be assigned to each player in the golf tournament based on the amount of time they were assigned to each broadcast platform. For example, players who spent more time in the higher performing platform may be ranked higher than players who spent more time in the lower performing platform. In some examples, such rankings may be updated over the course of a season and used to project the viewership ratings of upcoming tournaments (e.g., provided in the input parameters 202, 402 of FIGS. 2, 4). In some examples, the rankings may be used to distribute royalties, advertising deals, and other incentives to the players.

In some examples, sporting events may have individual competitions and team competitions that occur simultaneously. For example, in a golf tournament, each player may compete as an individual and as a member of a team (e.g. a group of four players). However, it is not always conducive to broadcast both the individual competition and the team competition together. Often times the team competition is overshadowed by the individual competition or is too confusing to follow. As such, the coverage of the individual competition may be assigned to a first platform (e.g., a television station) and the team competition may be assigned to a second platform (e.g., a streaming application). In some examples, the two broadcasts may air simultaneously (e.g., during the same target time period) such that viewers can chose between the two formats. It should be appreciated that the separate broadcasts are covering the same event, but may include different sequences of shots, different commentators, different leaderboards, etc. In some examples, the individual and team broadcast may be assigned to different target time periods. For example, the individual broadcast may air live and the team broadcast may air in a recorded format following the completion of the live tournament (e.g., on a different day or days). In some examples, both broadcasts may air on the same platform (e.g., a television channel). In other examples, the broadcasts may air on different platforms (e.g., a television channel and a streaming application). By creating two separate broadcasts of the same event, it may be possible to increase the projected viewership of the tournament. Likewise, it may be possible to increase (e.g., double) the number of advertising opportunities associated with the event.

Advantageously, the systems and methods described herein represent and/or achieve a significant improvement in computer functionality. For example, use of the platform module 116 and the content module 118 (and the associated machine learning models 210 and 410) can improve the accuracy and/or automation of data processing. In various instances, for example, the platform module 116 and content module 118 are developed and trained to receive a wide variety and quantity of data (e.g., the input parameters) and to consider a variety of factors when projecting the viewership rating of unaired content and determining target time periods for broadcasting such content to maximize the projected viewership. Such target time periods (and selected broadcast platforms) can be updated, as needed, when any changes to the input parameters or viewership data are received. By training the platform module 116 and the content module 118 to generate optimized target time periods for broadcasts automatically and update the target time periods dynamically, in response to real-time changes in data, the input parameters and viewership data can be processed and considered more efficiently and accurately, compared to prior approaches.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation.

Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method of dynamically determining when to broadcast video content, the method comprising:
   providing one or more content parameters corresponding to broadcasted video content to a machine learning (ML) model, wherein the ML model is at least one of a neural network ML model and a support vector ML model;
   iteratively training the ML model to identify relationships between the one or more content parameters and viewership ratings associated with the broadcasted video content, wherein such iterative training improves the accuracy of the ML model;
   receiving a baseline viewership rating for unaired video content, the baseline viewership rating corresponding to at least one instance of previously aired video content that is similar in type to the unaired video content;
   receiving one or more content parameters corresponding to the unaired video content, wherein the one or more content parameters include (i) topical characteristics that are unique to the unaired video content and (ii) a desired platform for broadcasting the unaired video content during a target broadcast window;
   generating a projected viewership rating for the unaired video content by adjusting the baseline viewership rating based on the one or more content parameters;
   receiving viewership data associated with the unaired video content and/or the desired platform;
   providing the projected viewership rating, the one or more content parameters, and the viewership data to the trained ML model; and
   determining, via the trained ML model, an optimal time period for broadcasting the unaired video content on the desired platform during the target broadcast window, wherein the optimal time period corresponds to a maximum value for the projected viewership rating of the unaired video content during the target broadcast window on the desired platform.

2. The method of claim 1, further comprising:
   determining, via the trained ML model, the projected viewership rating of the unaired video content during the optimal time period.

3. The method of claim 1, wherein the viewership data includes a viewership rating of the desired platform during at least one prior time period.

4. The method of claim 1, wherein the viewership data includes a viewership rating of at least one platform other than the desired platform during at least one prior time period.

5. The method of claim 1, wherein in determining the optimal time period for broadcasting the unaired video content on the desired platform, the trained ML model is configured to project a viewership rating for similar content airing on at least one platform other than the desired platform during the optimal time period.

6. The method of claim 1, wherein in determining the optimal time period for broadcasting the unaired video content on the desired platform, the trained ML model is configured to project a viewership rating for similar content airing on at least one platform other than the desired platform during a second time period that occurs after the optimal time period.

7. The method of claim 1, wherein determining the optimal time period includes determining the optimal time period that maximizes the projected viewership rating for a particular demographic.

8. The method of claim 1, wherein the viewership data includes at least one Nielson rating of broadcasted video content.

9. The method of claim 1, wherein the projected viewership rating represents a projected number of viewers.

10. The method of claim 1, wherein the desired platform is a broadcast television platform.

11. The method of claim 1, wherein the desired platform is an online streaming platform.

12. The method of claim 1, further comprising:
   detecting, prior to the optimal time period, a real-time change to the one or more content parameters;
   providing the real-time change to the trained ML model to improve the accuracy of the trained ML model; and
   updating, via the trained ML model, the optimal time period for broadcasting the unaired video content on the desired platform such that the projected viewership rating of the unaired video content remains maximized in view of the real-time change to the one or more content parameters.

13. The method of claim 12, wherein detecting the real-time change to the one or more content parameters includes collecting and/or analyzing social media data related to the unaired video content.

14. A computer-implemented method of dynamically determining when to broadcast video content, the method comprising:
providing one or more content parameters corresponding to broadcasted video content to a machine learning (ML) model, wherein the ML model is at least one of a neural network ML model and a support vector ML model;
iteratively training the ML model to identify relationships between the one or more content parameters and viewership ratings associated with the broadcasted video content, wherein such iterative training improves the accuracy of the ML model;
receiving a baseline viewership rating for unaired video content, the baseline viewership rating corresponding to at least one instance of previously aired video content that is similar in type to the unaired video content;
receiving one or more content parameters corresponding to the unaired video content and a plurality of platforms for broadcasting the unaired video content during a target broadcast window, wherein the one or more content parameters include topical characteristics that are unique to the unaired video content;
generating a projected viewership rating for the unaired video content by adjusting the baseline viewership rating based on the one or more content parameters;
receiving viewership data associated with the unaired video content and/or the plurality of platforms;
providing the projected viewership rating, the one or more content parameters, and the viewership data to the trained ML model; and
determining, via the trained ML model, at least one optimal time period for broadcasting the unaired video content on a selected platform of the plurality of platforms during the target broadcast window, wherein the at least one optimal time period corresponds to a maximum value for the projected viewership rating of the unaired video content during the target broadcast window on the selected platform.

15. The method of claim 14, further comprising:
determining, via the trained ML model, the projected viewership rating of the unaired video content for the at least one optimal time period.

16. The method of claim 14, wherein the at least one optimal time period includes a first optimal time period associated with the selected platform and a different, second optimal time period associated with the selected platform.

17. The method of claim 16, wherein the first optimal time period and the second optimal time period are non-overlapping.

18. The method of claim 16, wherein the first optimal time period and the second optimal time period are consecutive time periods.

19. The method of claim 16, wherein the selected platform is a broadcast television platform.

20. The method of claim 16, wherein the selected platform is an online streaming platform.

21. The method of claim 16, wherein the unaired video content is to be broadcast on the selected platform during the first optimal time period and re-broadcast on the selected platform during the second optimal time period.

22. The method of claim 16, wherein a first portion of the unaired video content is to be broadcast on the selected platform during the first optimal time period and a second portion of the unaired video content is to be broadcast on the selected platform during the second optimal time period.

23. The method of claim 14, wherein the viewership data includes a viewership rating of the plurality of platforms during at least one prior time period.

24. The method of claim 14, wherein the viewership data includes a viewership rating of at least one platform other than the plurality of platforms during at least one prior time period.

25. The method of claim 14, wherein in determining the at least one optimal time period for broadcasting the unaired video content on the selected platform, the trained ML model is configured to project a viewership rating for similar content airing on at least one platform other than the selected platform during the at least one optimal time period.

26. The method of claim 14, wherein in determining the at least one optimal time period for broadcasting the unaired video content on the selected platform, the trained ML model is configured to project a viewership rating for similar content airing on at least one platform other than the at least one selected platform during a second time period that occurs after the at least one optimal time period.

27. The method of claim 14, wherein determining the at least one optimal time period that maximizes the projected viewership rating of the unaired video content includes determining the at least one optimal time period that maximizes the projected viewership rating for a particular demographic.

28. The method of claim 14, wherein the viewership data includes at least one Nielson rating of broadcasted video content.

29. The method of claim 14, wherein the projected viewership rating represents a projected number of viewers.

30. The method of claim 14, further comprising:
detecting, prior to the at least one optimal time period, a real-time change to the one or more content parameters;
providing the real-time change to the trained ML model to improve the accuracy of the trained ML model; and
updating, via the trained ML model, the at least one optimal time period for broadcasting the unaired video content on the selected platform such that the projected viewership rating of the unaired video content remains maximized in view of the real-time change to the one or more content parameters.

31. The method of claim 30, wherein detecting the real-time change to the one or more content parameters includes collecting and/or analyzing social media data related to the unaired video content.

32. A computer-implemented method of dynamically determining when to broadcast video content, the method comprising:
providing one or more content parameters corresponding to broadcasted video content to a machine learning (ML) model, wherein the ML model is at least one of a neural network ML model and a support vector ML model;
iteratively training the ML model to identify relationships between the one or more content parameters and viewership ratings associated with the broadcasted video content, wherein such iterative training improves the accuracy of the ML model;

receiving one or more content parameters corresponding to unaired video content and a plurality of platforms for broadcasting the unaired video content;

receiving viewership data associated with the unaired video content and/or the plurality of platforms;

providing the one or more content parameters and the viewership data to the trained ML model;

determining, via the trained ML model, at least one target time period for broadcasting the unaired video content on a selected platform of the plurality of platforms that maximizes a projected viewership rating of the unaired video content; and detecting, prior to the at least one target time period, a real-time change to the one or more content parameters;

providing the real-time change to the trained ML model to improve the accuracy of the trained ML model; and updating, via the trained ML model, the at least one target time period for broadcasting the unaired video content on the selected platform such that the projected viewership rating of the unaired video content remains maximized in view of the real-time change to the one or more content parameters, wherein the at least one target time period includes a first target time period associated with the selected platform and a different, second target time period associated with the selected platform.

\* \* \* \* \*